(12) United States Patent
Trayner et al.

(10) Patent No.: US 8,961,131 B2
(45) Date of Patent: Feb. 24, 2015

(54) ARRANGEMENT FOR EXTRACTING ENERGY FROM FLOWING LIQUID

(75) Inventors: Anthony Trayner, Fife (GB); Sam Syvertsen, His (NO); Jon Inge Brattekås, Arendal (NO); Jan Inge Eielsen, Hafrsfjord (NO)

(73) Assignee: Flumill AS, Stavanger (NO)

( * ) Notice: Subject to any disclaimer, the term of this patent is extended or adjusted under 35 U.S.C. 154(b) by 0 days.

(21) Appl. No.: 14/127,979

(22) PCT Filed: Jul. 4, 2011

(86) PCT No.: PCT/NO2011/000190
§ 371 (c)(1),
(2), (4) Date: Mar. 12, 2014

(87) PCT Pub. No.: WO2013/006061
PCT Pub. Date: Jan. 10, 2013

(65) Prior Publication Data
US 2014/0219776 A1 Aug. 7, 2014

(51) Int. Cl.
*F01D 5/02* (2006.01)
*F03B 17/06* (2006.01)

(52) U.S. Cl.
CPC .............. *F01D 5/023* (2013.01); *F03B 17/06* (2013.01); *F03B 17/061* (2013.01); *Y02E 10/28* (2013.01); *Y10S 415/906* (2013.01)
USPC .................. 416/9; 290/42; 415/906; 416/176

(58) Field of Classification Search
USPC .............. 290/43, 54, 42; 415/4.3, 4.5, 66, 72, 415/906, 908, 4.2, 4.4; 416/9, 120, 123, 416/142, 147, 176
See application file for complete search history.

(56) References Cited

U.S. PATENT DOCUMENTS

| 259,860 | A | * | 6/1882 | Humphreys | ..................... 416/86 |
| 953,891 | A | * | 4/1910 | Atkins | ............................ 416/11 |

(Continued)

FOREIGN PATENT DOCUMENTS

| CN | 1745246 A | 3/2006 |
| CN | 101910622 A | 12/2010 |

(Continued)

OTHER PUBLICATIONS

Office Action with Search report of China Patent Office dated Sep. 22, 2014, submitted, inter alia, as statement of relevance for non-English references cited therein.

*Primary Examiner* — Edward Look
*Assistant Examiner* — Christopher R Legendre
(74) *Attorney, Agent, or Firm* — Christian D. Abel

(57) ABSTRACT

An arrangement for extracting energy from flowing liquid, such as tidal flows, oceanic currents and water flowing in rivers. The arrangement comprises a support device (12) and a turbine device (1) which is pivotally connected to the support device (12) about a substantially horizontal axis (18). The turbine device includes at least one helical turbine (2; 4), each having an axle connected to an energy converter (22; 24). The turbine device (1) has a proximate end and a distal end, the proximate end being pivotally connected to the support device (12), and the distal end being freely movable in a substantially vertical, circular path in the flowing liquid. This enables the turbine device, in use, to adjust to an operational angle with respect to a horizontal plane. The arrangement is characterized in that the distal end of the turbine device (1) is provided with at least one transverse bar (7), stabilizing the operational angle of the turbine device (1). Various flow guiding devices also contribute to stability and performance of the arrangement.

18 Claims, 15 Drawing Sheets

(56) References Cited

U.S. PATENT DOCUMENTS

| | | | | |
|---|---|---|---|---|
| 4,500,259 | A | * | 2/1985 | Schumacher ............... 416/122 |
| 4,717,832 | A | * | 1/1988 | Harris ............... 290/43 |
| 5,313,103 | A | * | 5/1994 | Hickey ............... 290/54 |
| 6,139,255 | A | * | 10/2000 | Vauthier ............... 415/7 |
| 7,633,174 | B1 | * | 12/2009 | Feiler ............... 290/43 |
| 2001/0000197 | A1 | * | 4/2001 | Gorlov ............... 114/274 |
| 2006/0257241 | A1 | * | 11/2006 | Eielsen ............... 415/71 |
| 2009/0022597 | A1 | * | 1/2009 | Bowie ............... 416/223 R |
| 2010/0266406 | A1 | * | 10/2010 | Eielsen ............... 416/84 |
| 2014/0219776 | A1 | * | 8/2014 | Trayner et al. ............... 415/71 |

FOREIGN PATENT DOCUMENTS

| | | | |
|---|---|---|---|
| FR | 0222352 A2 | * | 5/1987 |
| WO | WO2004/067957 A | | 8/2004 |
| WO | WO2006/059094 A | | 6/2006 |
| WO | WO2009/093909 A | | 7/2009 |
| WO | 2012/007686 A | | 1/2012 |

\* cited by examiner

ARRANGEMENT FOR EXTRACTING ENERGY FROM FLOWING LIQUID

TECHNICAL FIELD

This invention relates to an arrangement for extracting energy from flowing liquid, e.g. water.

More particularly, the invention relates to an arrangement for extracting energy from flowing liquid, the arrangement comprising a support device and a turbine device which is pivotally connected to the support device about a pivot axis, the turbine device including at least one helical turbine, each having an axle connected to an energy converter, the turbine device having a proximate end and a distal end, the proximate end being pivotally connected to the support device, and the distal end being freely movable in a circular path in the flowing liquid, the circular path describing a plane perpendicular to the pivot axis, thus enabling the turbine device, in use, to adjust to an operational angular position around the pivot axis.

BACKGROUND ART

Tidal flows, oceanic currents and water current in rivers represent considerable amounts of unexploited energy. Numerous attempts have been made to provide efficient and reliable systems for extracting energy from such flowing liquid.

Tidal mills, such as structures resembling a wind mill and arranged on the seabed, are known. Such arrangements typically have the disadvantage that considerable forces and bending moments arise, which must be withstood or absorbed by a supporting tower structure.

WO-2004/067957 describes a helical turbine device that may be disposed under water. The shaft of the screw turbine is connected to a generator. The screw turbine and the generator arrangement are rotatably connected to a foundation on the seabed. The turbine blade has sufficient buoyancy as to raise the screw turbine to a diagonal position in the water when in use.

An arrangement of the type mentioned in the introduction has been disclosed in WO-2009/093909. This publication describes a helical turbine arrangement including two helical turbines with opposite pitches, arranged in parallel and overlapping each other. The screw turbine shafts are connected to generators. The arrangement is rotatably connected to a bottom mount on the seabed. The turbine blades have sufficient buoyancy as to raise the screw turbine to a diagonal position in the liquid when in use. This prior art technology makes it possible to convert energy of flowing liquid, such as tidal flows, to electric energy, without the disadvantage of the bending moments/forces of the prior, rigid tidal mills. However, it still has certain drawbacks with regard to overall performance, such as energy efficiency and stability of power output. In particular, tests have shown that the power output of the generators suffer from excessive fluctuations or variations.

SUMMARY OF THE INVENTION

An object of the present invention is to remedy or reduce at least one of the drawbacks of the solutions of the background art. The invention has been defined by the claims.

BRIEF DESCRIPTION OF THE DRAWINGS

The invention has been illustrated by non-limiting examples in the accompanying drawings, in which.

DETAILED DESCRIPTION

Figure 1:
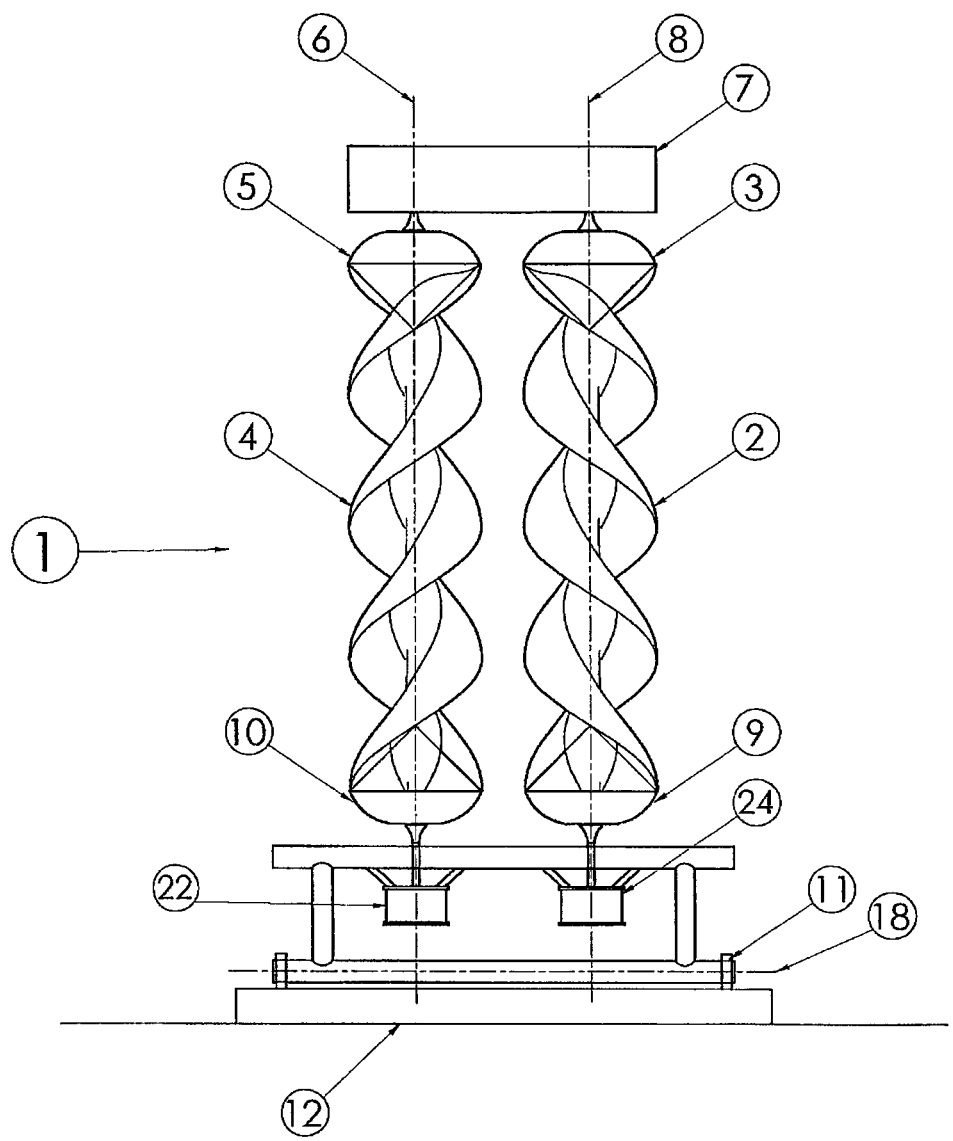
FIG. 1 shows schematically a front view of a first embodiment of an arrangement for extracting energy from flowing liquid.

Identical reference numerals have been used throughout the figures for denoting identical or corresponding elements.

FIG. 1 shows schematically a front view of a first embodiment of an arrangement for extracting energy from flowing liquid. The flowing liquid may be flowing water, e.g. sea water (for instance, tidal flow or oceanic current) or fresh water (for instance, water flowing in a river). The flowing liquid may alternatively be flowing brackish water, flowing waste water or any other liquid which holds kinetic energy which shall be extracted/exploited.

The arrangement comprises a support device 12, which in this embodiment has been mounted on the sea bed. The support device may be mounted on the seabed by means of a gravity base foundation, or a pinned foundation, or a mono pile or multi pile foundation, or any combination of such foundations. In the figure, for simplicity of illustration, the support device 12 and the portion of the sea bed on which the support device has been arranged, are both horizontal. However, it should be understood that the support device may be suitably adapted to e.g. a sloping or irregular portion of the sea bed.

In an alternative aspect of the first embodiment, the support device 12 may also be an anchored, moored or tethered buoyant platform positioned at an intermediate depth between the bottom and the surface.

The arrangement further comprises a turbine device 1 which is pivotally connected to the support device 12 about a pivot axis 18, which in this first embodiment is horizontal, or at least substantially horizontal. The pivotal connection is arranged on the upper side of the support device. The pivotal connection may be provided by a horizontal shaft on the turbine device, the shaft being rotatable with respect to the support device by means of bearings 11 arranged at each end. In other embodiments the bearings can be arranged in the middle or throughout, of the shaft (e.g., plain bearings or rolling-element bearings) or similar swivel elements.

In other aspects the pivot axis 18 may be arranged at any angle. For instance, the pivot axis may be horizontal or at least substantially horizontal, as exemplified in the first to fifth embodiments, it may be vertical or at least substantially vertical, as exemplified in the sixth embodiment, or it may be diagonal, as exemplified in the seventh embodiment.

The pivotal connection can also be arranged partially or fully inserted inside the support device.

The turbine device 1 includes two helical turbines 4 and 2. Each turbine device has an axle, or shaft, which is connected to an energy converter, illustrated at 22, 24 respectively. In alternative embodiments the shafts may be connected to a transmission which again impels a common energy converter.

In alternative embodiments the turbine device may include one, three, four or any greater number of helical turbines. In particular aspects the turbine device includes an even number of helical turbines, although an odd number is also possible. In case of more than two helical turbines, the helical turbines are advantageously arranged in-line, i.e. with their parallel rotational axes intersecting one single transverse line.

The helical turbines 4, 2 are arranged adjacent to each other with parallel rotational axes. The helical turbines, as illustrated, also have opposite screwing motion, or handedness. Thus, they will be contra-rotating during operation. In FIG. 1 the helical turbine 4, shown to the left, is right-handed, while the helical turbine 2, shown to the right, is left-handed. In alternative embodiments where the turbine device includes more than two helical turbines with parallel axes, any pair of adjacent helical turbines may advantageously have opposite handedness.

The helical turbines may be so designed that in tidal flows where the flow of water reverses direction the helix will always rotate in the same direction.

The energy converters 22, 24 may be plain electrical generators and/or electrical generators with gear systems. In alternative embodiments the energy converters may be pumps, e.g. for providing pressurized air. Generally speaking, the energy converters may be any type of energy converting device which converts rotational energy, provided by the kinetic energy of the flowing liquid, to a different form of energy.

The turbine device 1 has a proximate end, shown at the lower part of FIG. 1, and a distal end, shown at the upper part of FIG. 1. The proximate end of the turbine device 1 is pivotally connected to the support device 12.

Due to the pivotal connection between the proximate end of the turbine device 1 and the support device, the distal end of the turbine device 1 is freely movable in a circular path in the flowing liquid. The circular path describes a plane which is perpendicular to the pivot axis 18. Since the pivot axis 18 is horizontal or substantially horizontal in this first embodiment, the distal end of the turbine device will be freely movable in a substantially vertical, circular path in the flowing liquid. Circular path should in this respect be understood as a path forming a part of a circle, such as a semicircle or another circular arc. This enables the turbine device 1, in use, i.e., when the liquid is flowing and forces the turbines to rotate around their rotational axes 6, 8, to adjust its position to a particular operational angular position around the pivot axis.

The operational angular position may, in the first embodiment, e.g., be measured as the angle of the turbine device (e.g., the angle of one of the turbine axes) with respect to the horizontal plane. In an alternative aspect, the operational angular position may be determined with respect to a vertical plane. In still another aspect, the operational angular position may be determined with respect to a representative vector describing the flow direction of the flowing liquid.

In the embodiment shown in FIG. 1, i.e. in a configuration where the helical turbines are mounted facing upwards from the pivot axis or swiveling point, the operational angular position may be achieved by providing the helical turbines with suitable buoyancy, in such a way that the net buoyancy of the turbine arrangement as a whole is positive. In this way, when the liquid surrounding the arrangement is stagnant (e.g., at slack tide), the turbine device 1 will erect to a substantially vertical position, i.e. an operational angle of approx. 90 degrees with respect to the horizontal plane. As the liquid flow increases, the turbine device 1 will pivot around the horizontal axis 18 so that the turbine axes 6, 8, in varying flows of liquid, e.g., tidal streams and river streams, take a different, less operational angle with respect to the horizontal plane. The angle may be variable as the flow of liquid increases or decreases.

If the liquid flow varies in increases towards the capacity of the energy conversion device, the angle of the turbine device will be shifted to a less energy producing angle.

According to the invention, in order to improve overall performance, the distal end of the turbine device 1 is provided with at least one extension member in the form of a transverse bar 7, with the effect of stabilizing the operational angular position of the turbine device 1. This effect may be particularly prominent in the high energy producing range, i.e., at higher liquid velocities, or higher liquid flow.

In addition, or alternatively, the transverse bar may provide buoyancy and a physical shape to provide lift/disturbance in the flow with the effect of allowing the flow of liquid to more expeditiously push the turbine device over to its operational range. This effect may be particularly prominent at lower liquid velocities, or lower liquid flow.

Improving the overall performance may additionally or alternatively involve at least one of the following advantages of the invention:
  improving the ability to get the turbine arrangement over to its high energy producing range expeditiously,
  maintaining the turbine arrangement in its high energy producing range over time,
  improving energy efficiency,
  improving stability of power output,
  reducing vibrational movement of the helical turbines, which might otherwise result in high fatigue load conditions and poor lifecycle conditions.

The transverse bar 7 intersects the axis 6 of the helical turbine 4 and the axis 8 of the helical turbine 2 at the distal end of the turbine device 1, i.e. shown at the upper part of FIG. 1.

In the illustrated embodiment of FIG. 1, the turbine arrangement also includes a terminating cap 3 provided on a distal end of the helical turbine 2 and a terminating cap 5 provided on a distal end of the helical turbine 4.

The terminating end cap may close/complete the ends of the helix in such a way that the torque output fluctuations caused by the open ended helix overcome/smoothed such that the power output of the generators do not suffer from excessive fluctuations or variations.

Although both the transverse bar 7 and the terminating caps 3, 5 have been shown together in the illustrated embodiment, it should be appreciated that a transverse bar or distal terminating caps may be arranged separately and not necessarily in combination.

Each terminating cap 3 or 5 has a conical surface on its face that points towards the proximate end of the respective helical turbine.

The end caps may in certain aspects provide substantial additional buoyancy that will hold the device in its optimal operational range. In particular liquid flow conditions, the terminating cap may smooth the flow of water across the helical turbine and reduce power fluctuations from the helical turbine.

In an embodiment, each conical surface may be provided with radial fin members.

The radial fin members may, in particular in certain liquid flow conditions, further reduce the power fluctuations and also increase the power generated from the helical turbines.

In the illustrated embodiment of FIG. 1, the turbine arrangement also includes a terminating cap 9 provided on a proximate end of the helical turbine 2 and a terminating cap 10 provided on a proximate end of the helical turbine 4. Although both the transverse bar 7, the distal terminating caps 3, 5 and the proximate terminating caps 9, 10 have been shown together in the illustrated embodiment, it should be appreciated that the proximate terminating caps may be arranged separately and not necessarily in combination with the distal terminating caps and the traverse bar.

In the embodiments shown in FIG. 1, and in any embodiments or configurations where the helical turbines are mounted above the support device, e.g. on the seabed, the helical turbines and the transverse bar may be designed with suitable buoyancy, i.e. with net density less than the density of the liquid, e.g. water.

The helical turbines and the transverse bar may be made of a composite material such as Glass Reinforced Plastic (GRP) or fibreglass or thermal plastics.

In other embodiments the transverse bar may be made of flexible inflatable rubberized materials such as natural rubber or manmade synthetic rubber materials.

The above example materials may be used for all embodiments in the present specification.

Buoyancy of elements such as the helical turbines and the transverse bar may be obtained by manufacturing these elements as hollow shells, usually filled with air, or by manufacturing them using light-weight materials. Buoyancy may be adjusted by providing ballast, e.g., ballast chambers to be filled with water if necessary.

Figure 2:
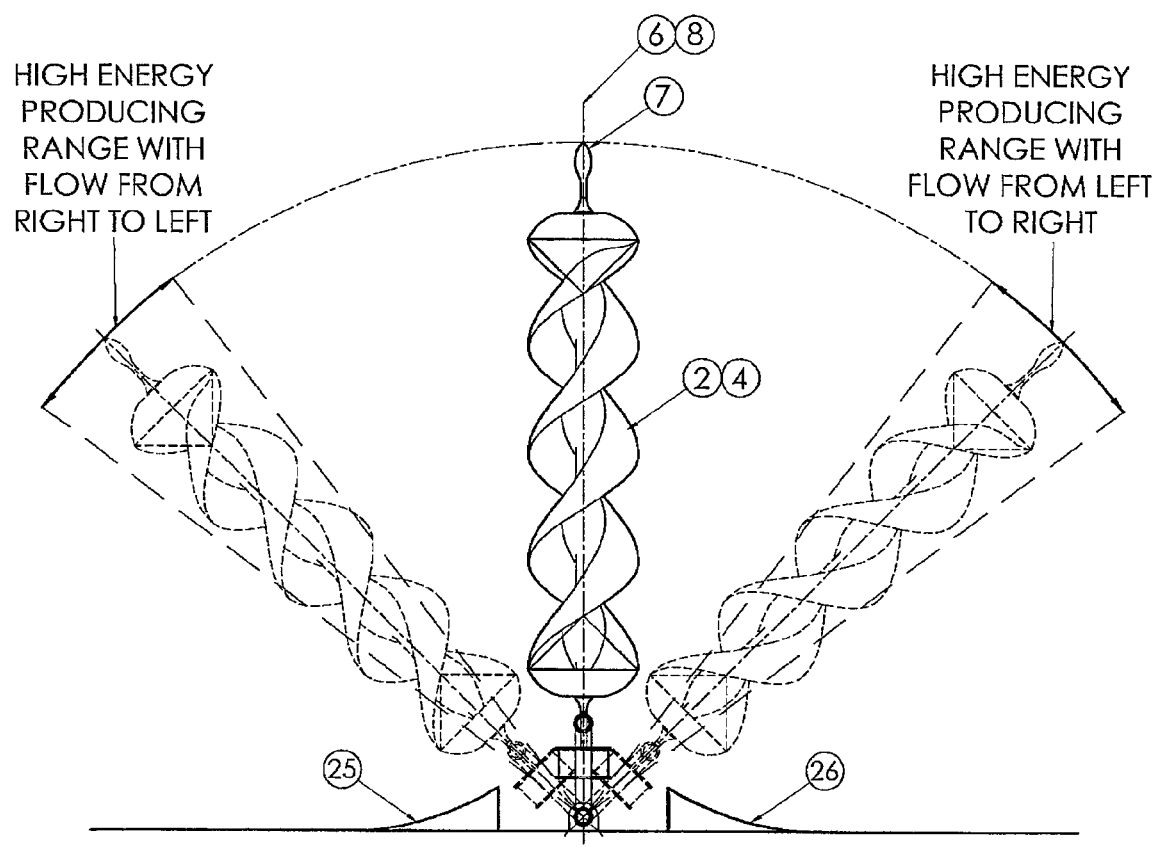
FIG. 2 shows schematically a side view of the first embodiment of an arrangement for extracting energy from flowing liquid.

FIG. 2 shows schematically a side view of the first embodiment of an arrangement for extracting energy from flowing liquid.

For illustration, the turbine device has been shown in three positions. In the middle position, drawn with solid lines, the turbine device takes a vertical direction. This would be the case if the liquid (e.g., the water) surrounding the arrangement is stagnant, i.e., the liquid flow is zero or substantially zero. As already explained with reference to FIG. 1 above, the turbine device 1 will in this situation erect to a substantially vertical position, i.e. an operational angle of approx. 90 degrees when determined with respect to the horizontal plane.

The left position, drawn with dotted lines, shows the situation where a substantial liquid flow is present from the right to the left. The turbine device 1 pivots around the horizontal axis so that the turbine axes take an operational angle less than 90° when determined with respect to the horizontal plane. This position corresponds to an operation within a high energy producing range.

The right position, also drawn with dotted lines, shows the situation where a substantial liquid flow is present from the left to the right. The turbine device 1 pivots around the horizontal axis so that the turbine axes take an operational angle less than 90° when determined with respect to the horizontal plane. This position also corresponds to an operation within a high energy producing range, this time in the opposite direction.

FIG. 2 also shows the possible additional features of flow guiding devices in the form of curved guide plates 25, 26 arranged at the seabed. The guide plates may be separate units, or they may be attached to the support device, or be integral parts of the support device. The guide plates are arranged on either side of the turbine device in the direction of the flow of liquid. Such guide plates 25, 26 may be positioned in the liquid flow so as to direct the liquid flow below the helix turbines into the helix turbines at a suitable angle to enhance the operation of the turbine device. The guide plates 25, 26 may be made of a composite material, e.g., the same material as the helical turbines, or any other material suitable for underwater use.

The flow guiding devices, including the guide plates 25, 26, have the effect of improving the overall performance of the arrangement.

In particular, the torque output of the rotating helical turbines is improved, made smoother and/or stabilized. As a result, improved power output has proven to be achieved.

For instance, a portion of flow that would otherwise not act on the turbines 2, 4, (e.g., the lower part of the flow above the seabed and below the proximate end of the turbine) may be directed onto the turbine by means of the guide plates 25, 26, thus increasing power output.

Figure 3:
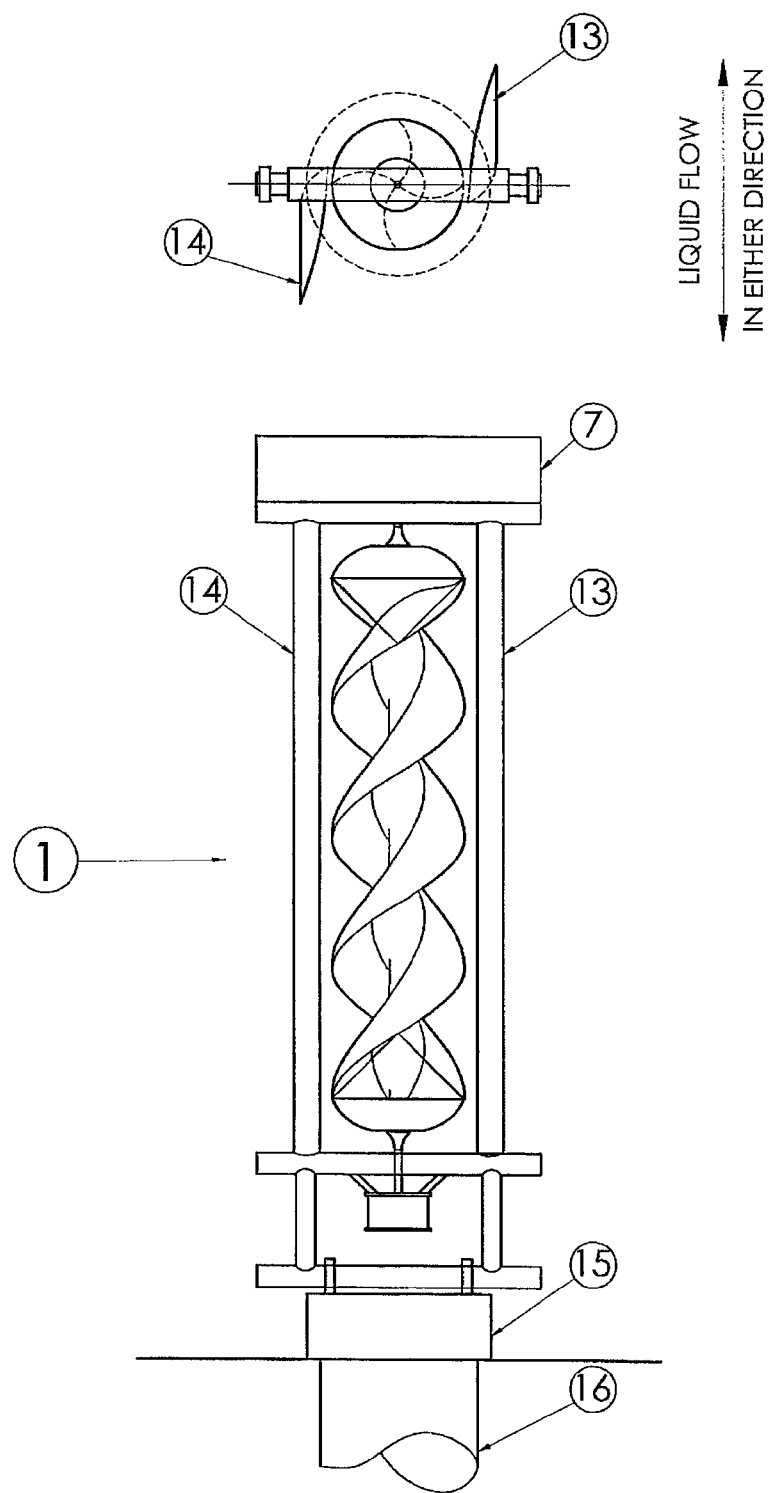
FIG. 3 shows schematically a top view and a front view of a second embodiment of an arrangement for extracting energy from flowing liquid.

FIG. 3 shows schematically a top view and a front view of a second embodiment of an arrangement for extracting energy from flowing liquid. The top view has been shown at the upper part of FIG. 3, while the front view has been shown at the lower part of FIG. 3.

In the second embodiment, the turbine device includes only one single helical turbine, which has an axle connected to an energy converter.

Corresponding to the first embodiment illustrated in FIGS. 1 and 2, the distal end of the turbine device 1 is provided with a transverse bar 7, with the effect of stabilizing the operational angle of the turbine device 1, in particular at a high energy producing range, in different flow conditions.

In order to prevent the transverse bar 7 from rotating with the helical turbine's axle, the transverse bar 7 is connected to parallel, longitudinal columns 13, 14, provided at each side of the helical turbine. The columns 13, 14 also serve as a supporting frame, improving and stabilizing the fastening of the transverse bar 7.

Each column 13, 14 may be hydrodynamically shaped to accelerate the flow of water across the column and increase the liquid flow rates on the outer edge of the helical turbine and hence increasing the power output from the helical turbine. This may be provided by forming each column with a flow enhancing, hydrodynamic fin shape, as can easily be seen in the top view. The fins may protrude in opposite directions to allow for equilibrium in operation for flow in either direction through the helical turbine.

The flow guiding devices, including the fin shaped columns, have the effect of improving the overall performance of the arrangement. In particular, the torque output of the rotating helical turbines is increased and/or stabilized. As a result, improved power output has proven to be achieved.

Also illustrated in FIG. 3 is another embodiment of a support device where the device is connected, using a quick connect device to a pre-installed mono pile 16.

Figure 4:
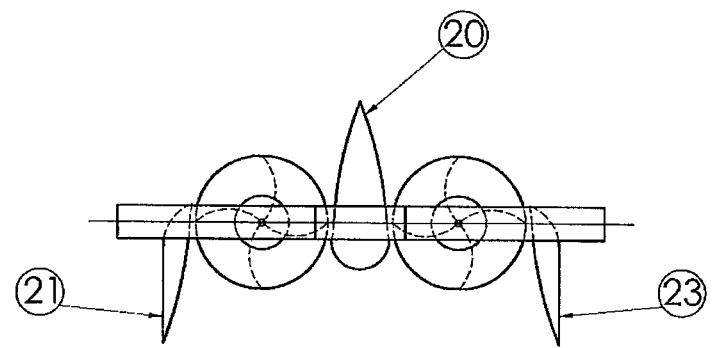
FIG. 4 shows schematically a top view and a front view of a third embodiment of an arrangement for extracting energy from flowing liquid.
Figure 4:
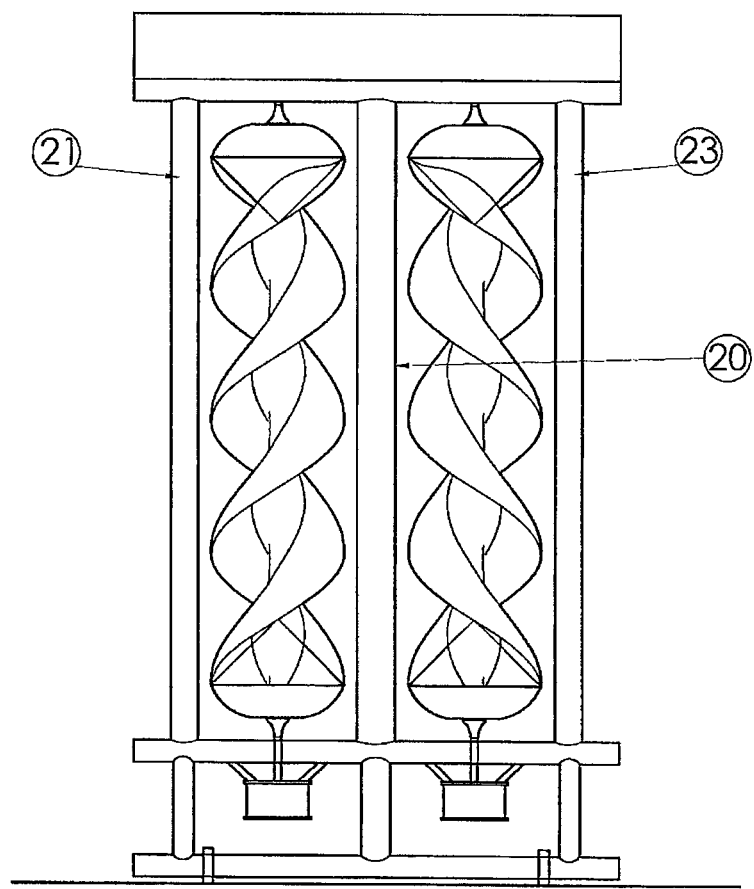

FIG. 4 shows schematically a top view and a front view of a third embodiment of an arrangement for extracting energy from flowing liquid. The top view has been shown at the upper part of FIG. 4, while the front view has been shown at the lower part of FIG. 4.

The third embodiment corresponds largely to the first embodiment illustrated in FIGS. 1 and 2. However, parallel, longitudinal columns 20, 21, 23 are provided between the helical turbines and at the outer sides of the helical turbine. The columns 20, 21, 23 serve as a supporting frame which may also improve the flow of liquid to the turbine, providing additional buoyancy if necessary, and stiffening the arrangement.

Advantageously, each column 20, 21, 23 is provided with a flow guiding device. This may be provided by forming each column with a hydrodynamic fin shape, as can easily be seen by example in the top view of FIG. 4. The fins may be so designed that the effect of the fins will be the same on the device should the flow on the device reverse, e.g. in tidal streams. Adjacent fins may protrude in opposite directions. Hence, the centre fin 20 may protrude to one side of the turbine device while the side fins 21, 23 may protrude to the opposite side of the turbine device.

The flow guiding devices, including the centre fins and side fins, have the effect of improving the overall performance of the arrangement. In particular, the torque output of the rotating helical turbines is smoothed and/or stabilized. As a result, improved stability of power output has proven to be achieved.

The columns, i.e., the centre fin 20 and the side fins 21, 23, may be made of composite material, e.g. the same material as the helical turbines. They may be made wholly or partly hollow to provide for suitable buoyancy.

Figure 5:
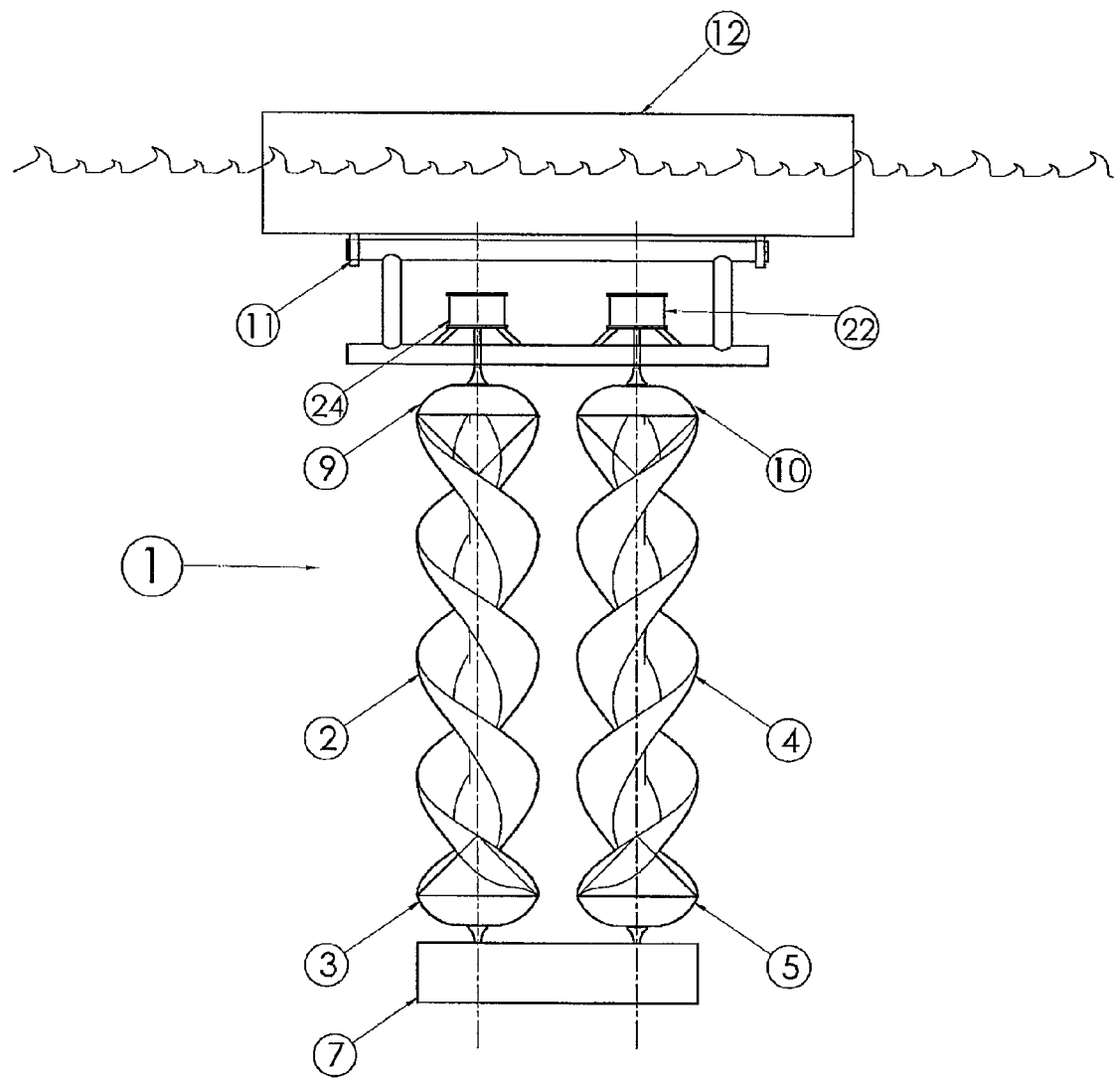
FIG. 5 shows schematically front view of a fourth embodiment of an arrangement for extracting energy from flowing liquid.

FIG. 5 shows schematically front view of a fourth embodiment of an arrangement for extracting energy from flowing liquid.

The fourth embodiment may be considered as an upside-down version of the first embodiment shown in FIGS. 1 and 2. Hence, reference is made to the detailed description of FIGS. 1 and 2, and the differences are explained below.

In the fourth embodiment, the support device 12 may be floating and/or anchored, or otherwise arranged on or above the surface of the liquid. In such configurations the turbine device 1 may be pivotally connected to the support device on a lower side of the support device 12. The pivotal connection may be achieved in a corresponding way as in the first embodiment.

In such an embodiment the turbine device 1 would be positively weighted such that the turbine device would hang vertically down at stagnant water or minimal water flow (e.g., slack tide). The helical turbines (2; 4), the terminating caps 3, 5, 9, 10 and the transverse bar 7 may contain liquid (e.g., water) and/or be additionally ballasted to allow the turbine device to work within an appropriate operating range.

Figure 6:
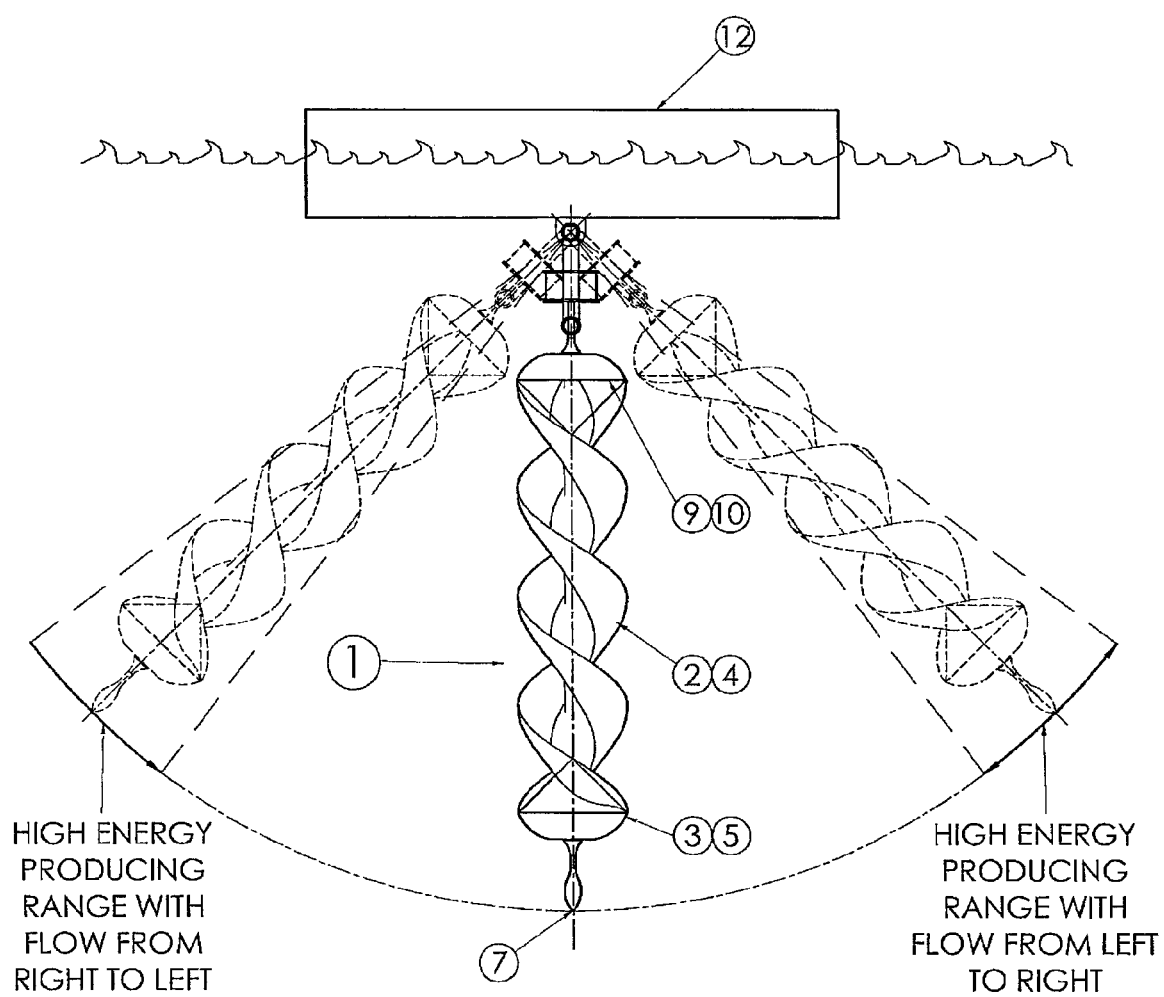
FIG. 6 shows schematically a side view of the fourth embodiment of an arrangement for extracting energy from flowing liquid.

FIG. 6 shows schematically a side view of the fourth embodiment of an arrangement for extracting energy from flowing liquid.

FIG. 6 shows schematically three possible positions or operational angles of the fourth embodiment.

In the middle position, drawn with solid lines, the turbine device takes a vertical, downwards direction. This would be the case if the liquid (e.g., the water) surrounding the arrangement is stagnant, i.e., the liquid flow is zero or substantially zero. The turbine device 1 will in this situation drop to a substantially vertical position, i.e. an operational angle of approx. 90 degrees with respect to the horizontal plane.

The left position, drawn with dotted lines, shows the situation where a substantial liquid flow is present from the right to the left. The turbine device 1 pivots around the horizontal axis so that the turbine axes take an operational angle less than 90° when determined with respect to the horizontal plane and when the turbine device operates within a high energy producing range.

Correspondingly, the right position, also drawn with dotted lines, shows the situation where a substantial liquid flow is present from the left to the right. The turbine device 1 pivots around the horizontal axis so that the turbine axes take an operational angle less than 90° when determined with respect to the horizontal plane and when the turbine device operates within the high energy producing range, this time in the opposite direction.

In an alternative aspect of the fourth embodiment, the support device 12 may be attached to an anchored buoyant platform positioned at an intermediate depth between the bottom and the surface.

In the embodiments shown in FIGS. 5 and 6, i.e. in embodiments and configurations where the helix is mounted below the support device, the helical turbines and the transverse bar, and possibly other additional elements, may be designed with suitable weight, i.e. with net density higher than the density of the liquid, e.g. water. This may be obtained by routine material choice and/or by providing suitable ballast elements, as appropriate.

Figure 7:
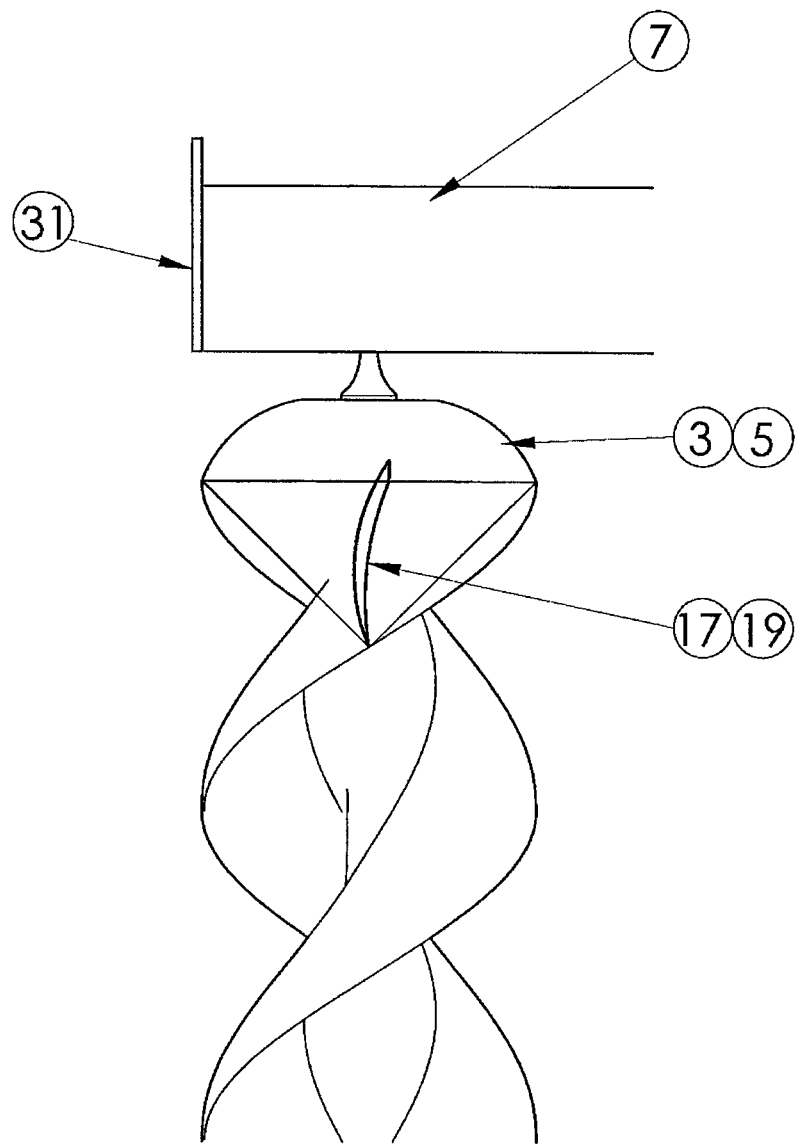
FIG. 7 shows schematically details of a transverse bar and a terminating cap of an arrangement for extracting energy from flowing liquid.

FIG. 7 shows schematically details of a transverse bar and a terminating cap of an arrangement for extracting energy from flowing liquid.

In certain embodiments, each helical turbine may be provided with a terminating cap provided on the distal end of each helical turbine. Such terminating caps may have a conical surface on its face that points towards the proximate end of the respective helical turbine, and the conical surface may be provided with radial fin members.

Also, in certain embodiments, each helical turbine may be provided with a terminating cap provided on the proximate end of each helical turbine. Such terminating caps may likewise have a conical surface on its face that points towards the distal end of the respective helical turbine, and the conical surface may be provided with radial fin members.

Furthermore in certain embodiments the transverse bar may be fitted with winglets 31 at its ends, to hydrodynamically increase the stability of the arrangement.

The terminating caps have the effect of improving the overall performance of the arrangement. In particular, the torque output of the rotating helical turbines is increased, smoothed and/or stabilized. As a result, improved stability of power output from the energy converters, in particular electrical generators, has proven to be achieved.

The distal end terminating caps 3, 5 may be provided with radial fin members 17, 19, respectively.

Figure 8:
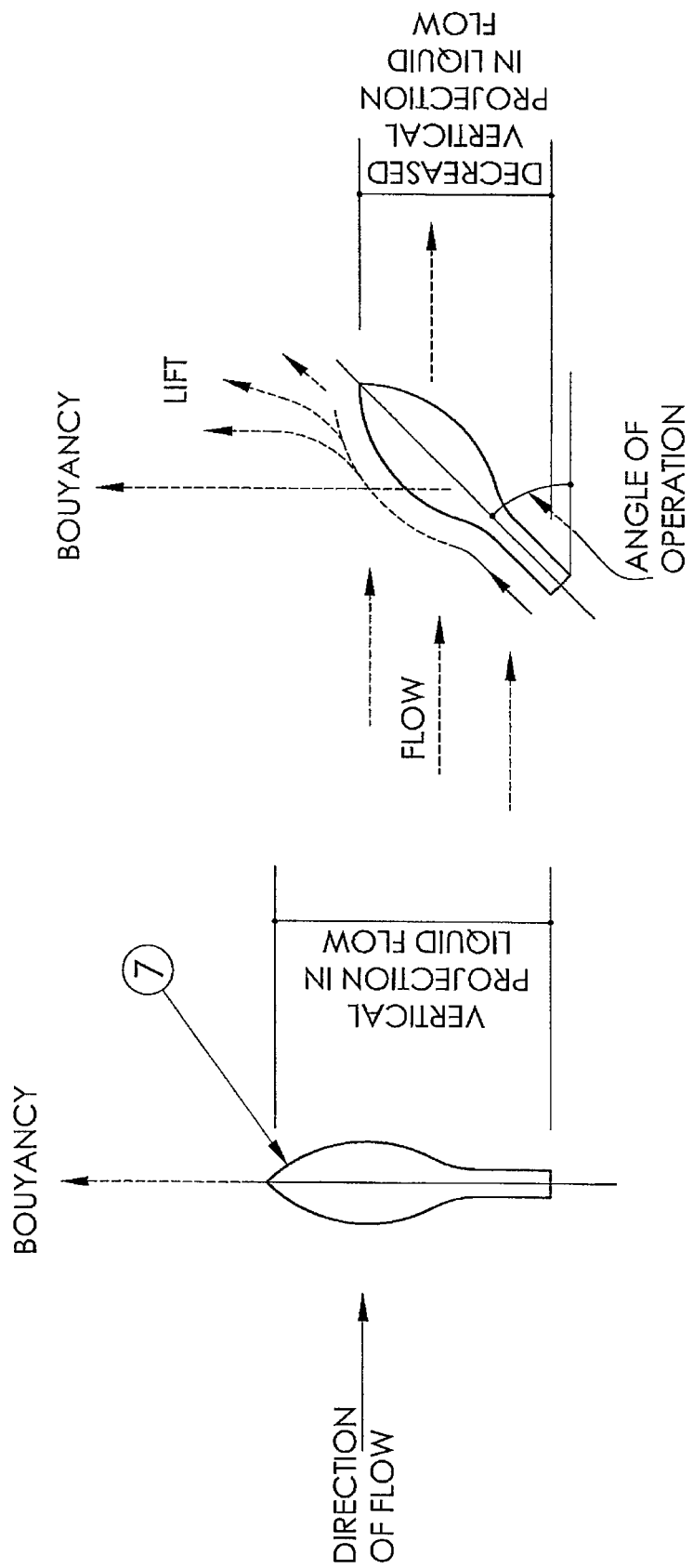
FIG. 8 illustrates schematically possible properties of a transverse bar.

FIG. 8 illustrates schematically possible properties of a transverse bar. The transverse bar 7 may be used in all embodiments in the present specification.

FIG. 8 shows schematically a side view of the transverse bar 7 in two situations.

To the left in FIG. 8 the transverse bar 7 is shown in a vertical state, which will be the case if the liquid (e.g., water)

is stagnant or the flow is substantially zero. The vertical projection of the transverse bar's surface area has been illustrated.

In the right portion of FIG. 8 the transverse bar 7 is shown in a diagonal state, which will be the case if the liquid (e.g., water) has a substantial flow in the direction shown by the arrows, i.e. from left to the right on the figure. As illustrated, the vertical projection of the transverse bar's surface area is reduced, hence reducing the force pushing the system over, compared with the vertical projection of the surface area in the vertical/stagnant case.

The transverse bar 7 advantageously has a profile which provides a hydrodynamic vertical force that increases as the liquid flow increases, that together with the pressure force gives an optimal position of the helix as the liquid flow increases.

The transverse bar may advantageously have a large surface area that the flowing liquid will act upon and help force the tidal device over to its operational position. Once in the operational position the transverse bar 7 with the liquid flow, over to and hold its optimum operational angle whereas the operational angle increases the surface area of the transverse bar in the liquid flow reduces.

Furthermore the hydrodynamic shape of the transverse bar is so designed as to provide hydrodynamic lift such that as the operational angle increases, the hydrodynamic lift increases. In this way the hydrodynamic lift helps maintaining the optimal operational angle. This may be advantageous for allowing load shedding.

In the illustrated embodiment the transverse bar may advantageously have built-in buoyancy that helps the turbine device maintaining its vertical position in stagnant liquids and substantially increase the stability of the turbine device in the liquid flow at its operational angle.

This leads to an improved overall performance, including improved stability of the operational angle of the turbine device 1. For instance, the angle stability may be improved even in case of disturbances or noise, such as arbitrary variations in the liquid flow.

Figure 9:
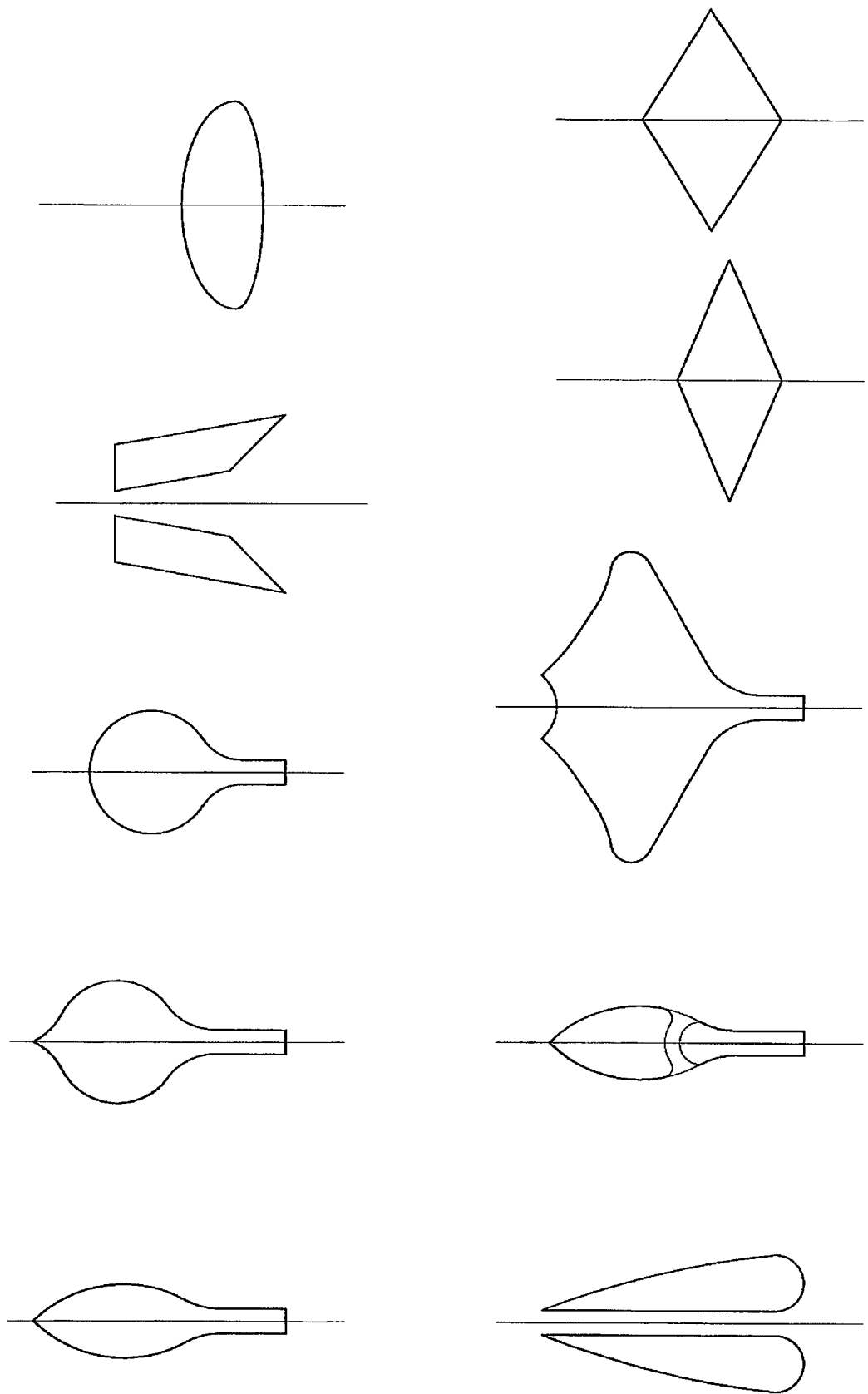
FIG. 9 shows schematically possible end profile designs of various transverse bars.

FIG. 9 shows schematically possible end profile, or cross sectional, designs of various transverse bars. Each transverse bar is specifically designed to suit the various flows in a particular tidal stream.

The physical shape and the amount of buoyancy within the transverse bar acting in tandem with the device has been shown to force the arrangement into the high energy producing range at low flow rates and to maintain the device at the high energy producing range for longer through the faster liquid flows.

Another aspect of the transverse bar is that at predetermined higher flow rates, where the energy being produced to the generators is greater than determined, the device will move over out of the high energy producing range, shedding load, to allow a more efficient predetermined rated generator to be utilized.

Figure 10:
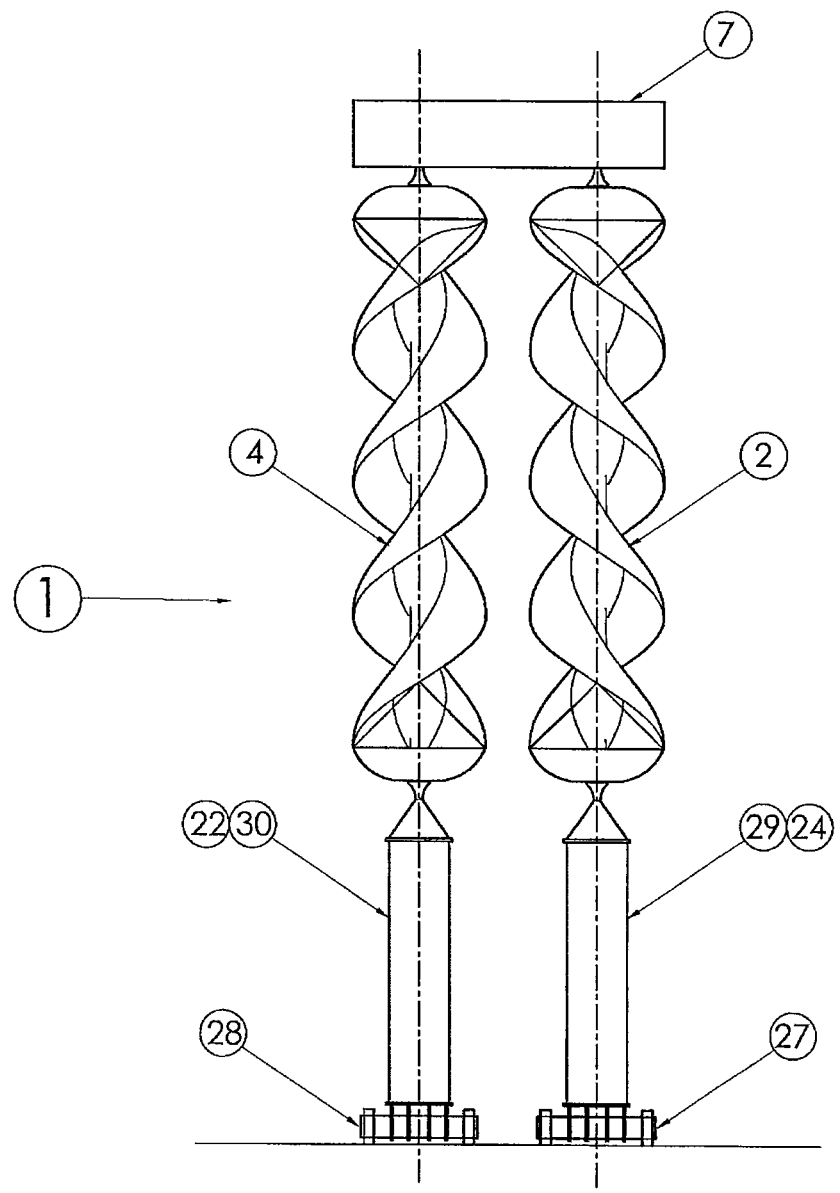
FIG. 10 shows schematically a front view of a fifth embodiment of an arrangement for extracting energy from flowing liquid.

FIG. 10 shows schematically a front view of a fifth embodiment of an arrangement for extracting energy from flowing liquid.

The fifth embodiment corresponds largely to the first embodiment illustrated in FIGS. 1 and 2. Hence, reference is made to the detailed description of FIGS. 1 and 2, and the differences are explained below.

In the fifth embodiment, the energy converters 22, 24 are directly connected and integrated into the proximate end of the helical turbines 2, 4.

Hence, the turbine device is pivotally connected to the support device by separate pivoting/swiveling elements 27, 28 arranged on the housings/enclosures 29, 30 of the energy converters 22, 24.

In an alternative aspect of the fifth embodiment, the housings/enclosures 29, 30 may also be directly connected by cross beams and/or other connection members.

Figure 11:
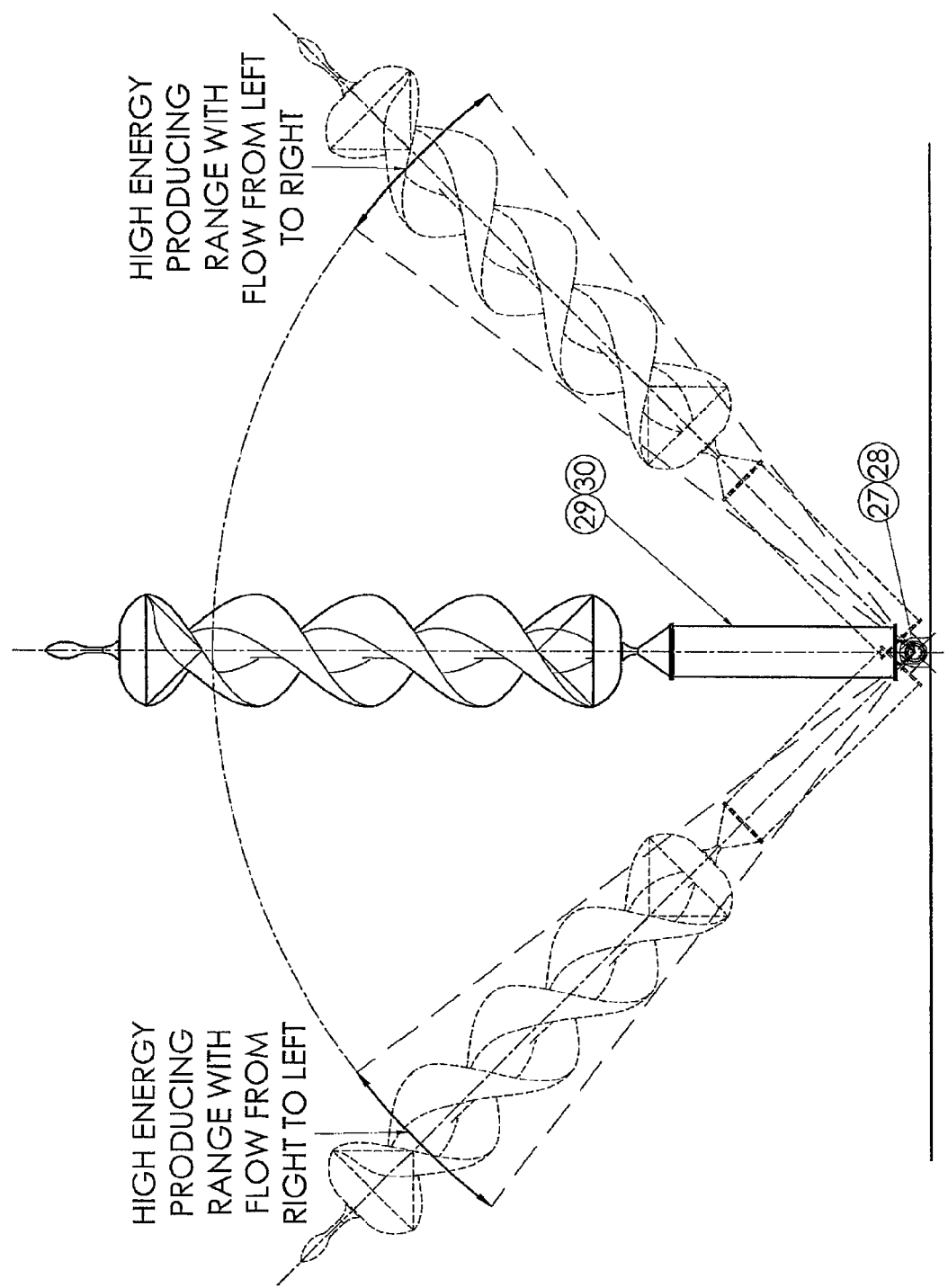
FIG. 11 shows schematically a side view of the fifth embodiment of an arrangement for extracting energy from flowing liquid.

FIG. 11 shows schematically a side view of the fifth embodiment of an arrangement for extracting energy from flowing liquid.

The turbine device has been shown in three positions. In the middle position, drawn with solid lines, the turbine device takes a vertical direction, corresponding to stagnant liquid. The left position, drawn with dotted lines, shows the situation where a substantial liquid flow is present from the right to the left. The turbine device 1 pivots around the horizontal axis so that the turbine axes take an operational angle less than 90° when determined with respect to the horizontal plane and operates within an operating range.

The right position, also drawn with dotted lines, shows the situation where a substantial liquid flow is present from the left to the right. The turbine device 1 pivots around the horizontal axis so that the turbine axes take an operational angle less than 90° when determined with respect to the horizontal plane and operates within the operating range.

Although not specifically shown in FIG. 11, the skilled person will recognize that flow guiding devices in the form of curved guide plates (corresponding to the elements 25, 26 shown in FIG. 2) may be arranged at the seabed also in the fifth embodiment, in order to improve the arrangement's overall performance.

Figure 12:
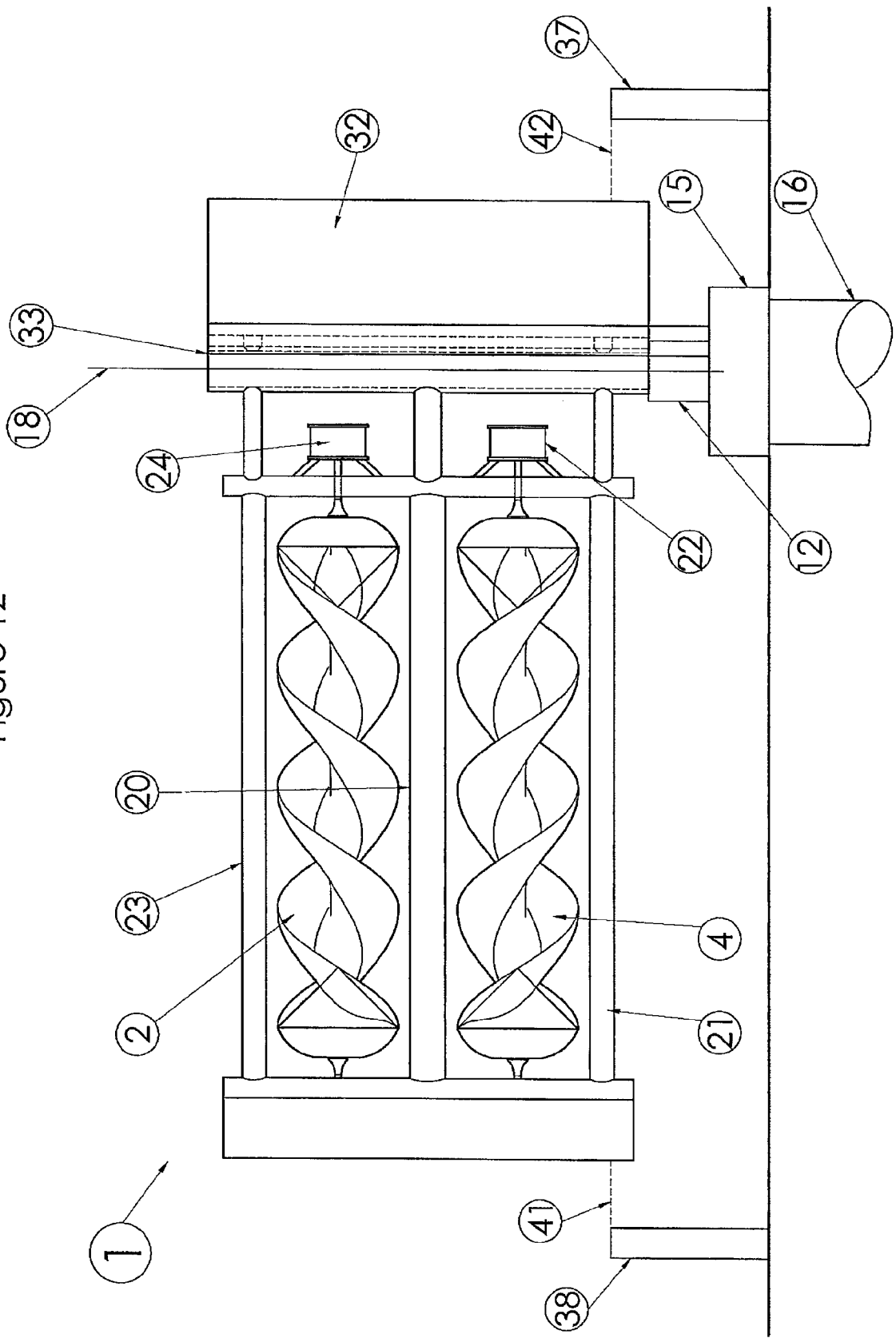
FIG. 12 shows schematically a front view of a sixth embodiment of an arrangement for extracting energy from flowing liquid.

FIG. 12 shows schematically a front view of a sixth embodiment of an arrangement for extracting energy from flowing liquid.

The sixth embodiment corresponds in many respects to the first embodiment shown in FIGS. 1 and 2 and the third embodiment shown in FIG. 4. Hence, reference is made to the detailed description of FIGS. 1, 2 and 4. Special features of the sixth embodiment are explained below.

The turbine device depicted includes two helical turbines 4 and 2, which have axles connected to energy converters 24 and 22 and the proximate end of the turbine device 1 is pivotally connected around the pivot axis 18. However, the particular aspects illustrated in FIG. 12 may also be employed with the other embodiments of the arrangement, such as the one-turbine, second embodiment shown and described above with reference to FIGS. 3.

In the first embodiment (FIGS. 1 and 2), the support device 12, to which the proximate end of the turbine device 1 is pivotally connected, is mounted substantially horizontally on the sea bed. Correspondingly, in the second embodiment (FIG. 3), the turbine is connected to a mono pile 16 by means of a quick connect device 15.

According to principles of the sixth embodiment, the turbine device 1 is pivotally connected to the support device 12 about an axis 18 which is not horizontal. As shown, the axis 18 is substantially vertical. Alternatively, the axis 18 may be at any angle from horizontal to vertical. This allows the turbine device 1 to extract energy from shallower depths of water.

In this aspect the turbine device 1, is connected to the support/counterweight structure 32 and pivots around a vertical axle 33 that is connected to the quick connect device 15. The buoyancy of the system may be that the turbine device 1 and the support/counterweight structure 32 may be weighted neutrally in the liquid.

Figure 13:
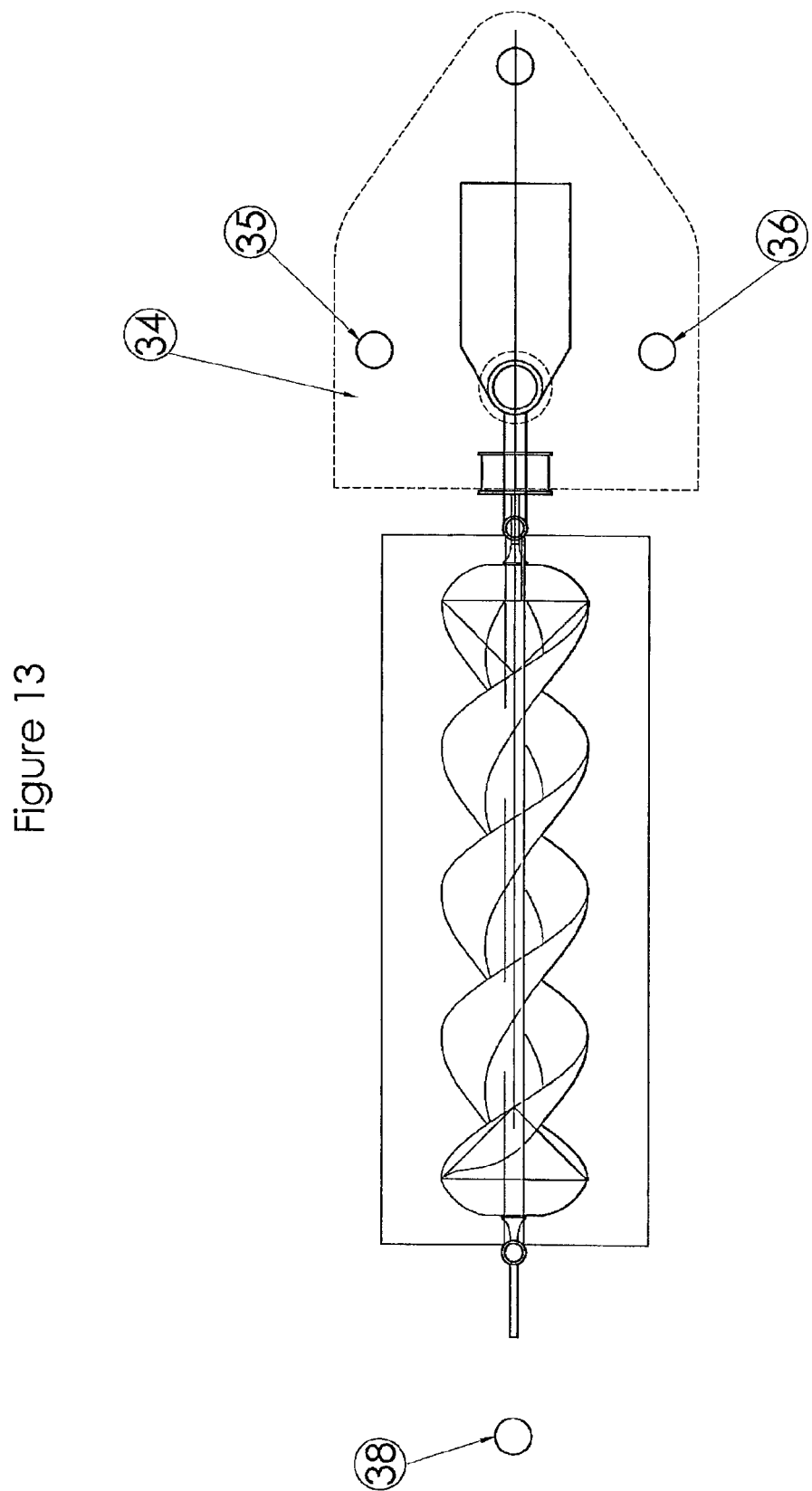
FIG. 13 shows schematically a plan view of the sixth embodiment of an arrangement for extracting energy from flowing liquid.

FIG. 13 shows schematically a plan view of the sixth embodiment of an arrangement for extracting energy from flowing liquid.

In this aspect the turbine device 1 and the support/counterweight structure 32 pivot around the vertical axle 33 which may be mounted on gravity base support device 34. The gravity base support device 34 may be fitted with two vertical stops 35 and 36, two mooring posts 37 and 38 are also shown.

Figure 14:
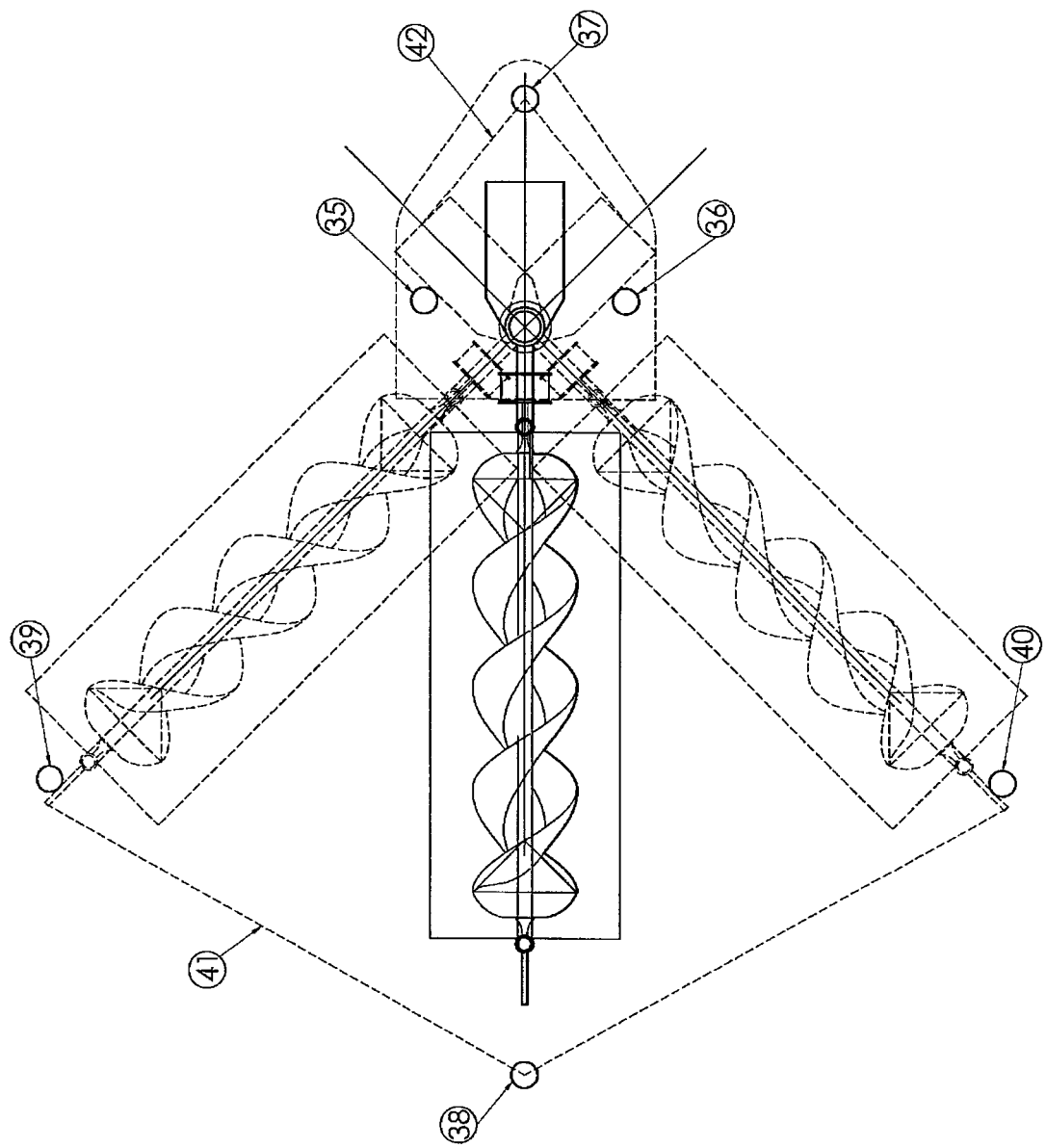
FIG. 14 shows schematically a plan view of the sixth embodiment of an arrangement for extracting energy from flowing liquid.

FIG. 14 shows schematically a plan view of the sixth embodiment of an arrangement for extracting energy from flowing liquid.

The arrangement could be held in its high energy producing position either by the vertical posts 35 and 36 and/or vertical stops 39 and 40.

Alternatively or in addition, the position may be held by means of the mooring post 38, which would be connected via the mooring cable 41 to the distal end of the turbine device 1.

Alternatively or in addition, the position may be held by means of the mooring post 37 which would be connected via the mooring cable 42 to the distal end of the turbine device 1.

When the fluid flows in a direction from left to right, the turbine device 1 would swing over either against the vertical post 39 and/or 36, and/or until the mooring cable 41 and/or 42 was taught against the mooring post 38 and/or 37

When the flow is from right to left the turbine device 1 would swing over either against the vertical post 40 and/or 35, and/or until the mooring cable 41 and/or 42 was taught against the mooring post 38 and/or 37.

Figure 15:
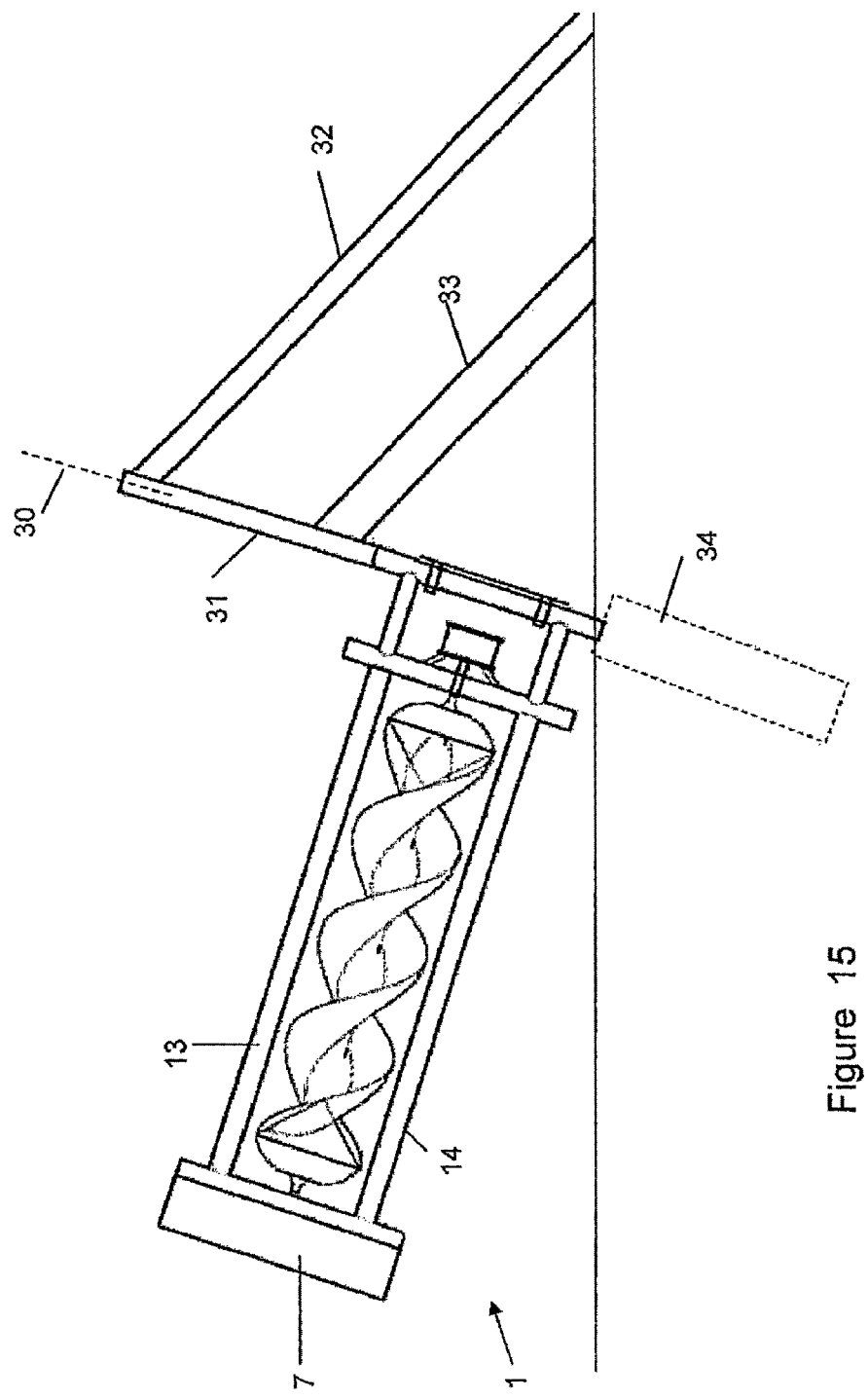
FIG. 15 shows schematically a front view of a seventh embodiment of an arrangement for extracting energy from flowing liquid.

FIG. 15 shows schematically a front view of a seventh embodiment of an arrangement for extracting energy from flowing liquid.

The seventh embodiment corresponds in many respects to the second embodiment shown in FIG. 3. Hence, reference is also made to the detailed description of FIG. 3.

In the seventh embodiment, as illustrated by example in FIG. 15, the turbine device includes only one single helical turbine, which has an axle connected to an energy converter. However, the special principles illustrated in FIG. 15 may also be employed with the other embodiments of the arrangement, such as the two-turbine, first embodiment shown and described above with reference to FIGS. 1 and 2.

In the first embodiment (FIGS. 1 and 2), the support device 12, to which the proximate end of the turbine device 1 is pivotally connected, is mounted substantially horizontally on the sea bed. Correspondingly, in the second embodiment (FIG. 3), the turbine is connected to a mono pile 16 by means of a quick connect device 15.

According to principles of the seventh embodiment, the turbine device 1 is pivotally connected to the support device 12 about an axis 30 which is not horizontal. As shown, the axis 30 may be diagonal. Alternatively, the axis 30 may be vertical.

The pivotal connection may in the seventh embodiment be provided by connection elements on the turbine device, such as a tubular cylinder arranged on the outside of a fixed, diagonal or vertical axle 31, providing pivotable movement of the turbine device with respect to the diagonal or vertical axle 31. The connection elements may include bearings or swiveling elements.

In the seventh embodiment of FIG. 15, the support device, to which the turbine device is pivotally connected, includes a first supporting member 34 which may, e.g. be a pile arranged on, or buried, at least partly, in the seabed. The axle 31 may be fixed to the first supporting member 34. The support device may further include at least one second supporting member 33 and possibly a third supporting member 32. The second and third supporting members may, e.g., comprise diagonal bars, shafts or poles, being firmly connected to the axle 31 at their respective upper ends and being firmly founded in the seabed at their respective lower ends.

Similarly to what is shown in FIG. 3, the distal end of the turbine device 1 is provided with a transverse bar 7, with the effect of stabilizing the operational angle of the turbine device 1 in different flow conditions. In order to prevent the transverse bar 7 from rotating with the helical turbine's axle, the transverse bar 7 is connected to parallel, longitudinal columns 13, 14, provided at each side of the helical turbine. The columns 13, 14 also serve as a supporting frame, improving and stabilizing the fastening of the transverse bar 7. Each column 13, 14 may be provided with a flow guiding device. This may be provided by forming each column with a flow enhancing, hydrodynamic fin shape, corresponding to what is shown in the upper part of FIG. 3. The fins may protrude in opposite directions.

The disclosed embodiments are intended to be merely illustrative and not limiting. Various modifications may be made without departing from the scope of the invention. The scope of the invention should not be limited by the detailed description or the figures. Instead, the scope of the invention has been defined by the following claims and their equivalents.

The invention claimed is:

1. An arrangement for extracting energy from flowing liquid, the arrangement comprising:
    a support device and a turbine device which is pivotally connected to the support device about a pivot axis,
    the turbine device including:
        at least one helical turbine, each having an axle connected to an energy converter;
        a proximate end and a distal end, the proximate end being pivotally connected to the support device, and the distal end being freely movable in a circular path in the flowing liquid, the circular path describing a plane perpendicular to the pivot axis,
        thus enabling the turbine device, in use, to adjust to an operational angular position around the pivot axis; wherein
    the distal end of the turbine device is provided with at least one transverse bar, stabilizing the operational angular position of the turbine device.

2. An arrangement according to claim 1,
    wherein the turbine device includes at least two helical turbines arranged with parallel rotational axes.

3. An arrangement according to claim 2,
    wherein adjacent helical turbines have opposite handedness.

4. An arrangement according to claim 2,
    wherein the transverse bar intersects the rotational axes of the at least two helical turbines at the distal end of the turbine device.

5. An arrangement according to claim 1,
    further comprising a terminating cap on the proximate end of each helical turbine.

6. An arrangement according to claim 5,
    wherein said terminating cap has a conical surface on its face pointing towards the proximate end of the respective helical turbine.

7. An arrangement according to claim 6,
    wherein said conical surface is provided with radial fin members.

8. An arrangement according to claim 1,
    further comprising a terminating cap on the distal end of each helical turbine.

9. An arrangement according to claim 1, wherein the transverse bar has a surface area which provides a hydrodynamic vertical force which increases as the operational angle increases.

10. An arrangement according to claim 1, wherein each helical turbine and the transverse bar are designed with densities and shapes which enable the turbine device, in use, to adjust to a predetermined operational angular position when the flowing liquid flows with a predetermined flow value.

11. An arrangement according to claim 1, further comprising at least one flow guiding device.

12. An arrangement according to claim 11, the at least one flow guiding device being selected from the set consisting of:
a centre fin, two side fins, and two guiding plates.

13. An arrangement according to claim 1, wherein each helical turbine and the transverse bar are made of a composite material.

14. An arrangement according to claim 1, wherein the support device is arranged at a sea bed or bottom.

15. An arrangement according to claim 1, wherein the support device is arranged at a water surface.

16. An arrangement according to claim 1 wherein the support device is arranged at an intermediary level between a bottom and a water surface.

17. An arrangement according to claim 1, wherein the pivot axis is substantially horizontal.

18. An arrangement according to claim 1, wherein the pivot axis is diagonal or vertical.

\* \* \* \* \*